United States Patent [19]

Skogberg et al.

[11] Patent Number: 4,509,889
[45] Date of Patent: Apr. 9, 1985

[54] METHOD OF ROCK BOLTING AND TUBE-FORMED EXPANSION BOLT

[75] Inventors: Bo T. Skogberg, Handen; Gunnar V. R. Romell, Djursholm, both of Sweden

[73] Assignee: Atlas Copco Aktiebolag, Nacka, Sweden

[21] Appl. No.: 572,830

[22] Filed: Jan. 23, 1984

Related U.S. Application Data

[62] Division of Ser. No. 127,776, Mar. 6, 1980.

[30] Foreign Application Priority Data

Mar. 9, 1979 [SE] Sweden ................................ 7902129

[51] Int. Cl.³ .............................................. E21D 21/00
[52] U.S. Cl. ..................................... 411/19; 405/259; 411/33
[58] Field of Search ....................... 405/259, 260, 261; 411/19, 20, 32, 33, 61, 74

[56] References Cited

U.S. PATENT DOCUMENTS

| | | | |
|---|---|---|---|
| 1,802,270 | 4/1931 | Rawlings | 411/61 |
| 2,015,081 | 9/1935 | McElhany et al. | |
| 2,324,520 | 7/1943 | Lamson | |
| 2,342,732 | 2/1944 | Gudmundsen | |
| 2,696,137 | 12/1954 | Thomas et al. | 411/74 |
| 3,148,577 | 9/1964 | Parsons | |
| 3,349,567 | 10/1967 | Munn | |
| 3,425,311 | 2/1969 | Levy | |
| 3,568,450 | 3/1971 | Whiting | |
| 3,665,719 | 5/1972 | Whiting | |
| 3,922,867 | 12/1975 | Scott | |
| 3,977,068 | 8/1976 | Krips | 29/421 R |
| 4,012,913 | 3/1977 | Scott | |
| 4,125,937 | 11/1978 | Brown et al. | 29/421 R X |

FOREIGN PATENT DOCUMENTS

| | | | |
|---|---|---|---|
| 0000576 | 2/1979 | European Pat. Off. | |
| 705153 | 5/1941 | Fed. Rep. of Germany | |
| 2728056 | 1/1979 | Fed. Rep. of Germany | |
| 1590097 | 4/1970 | France | |
| 2199090 | 4/1974 | France | |
| 2316528 | 1/1977 | France | |
| 91090 | 12/1937 | Sweden | 411/33 |
| 615245 | 1/1980 | Switzerland | |
| 2015057 | 9/1979 | United Kingdom | |

Primary Examiner—David H. Corbin
Attorney, Agent, or Firm—Frishauf, Holtz, Goodman & Woodward

[57] ABSTRACT

A tube-formed rockbolt is partly circular in its cross-section and opposite its circular portion (12) it has a deep depression (16–18). Its ends are sealed and its outer end has a hole (44, 45) or a fitting (24) through which the bolt can be supplied with high pressure water that expands the tube to anchor it in the borehole.

13 Claims, 22 Drawing Figures

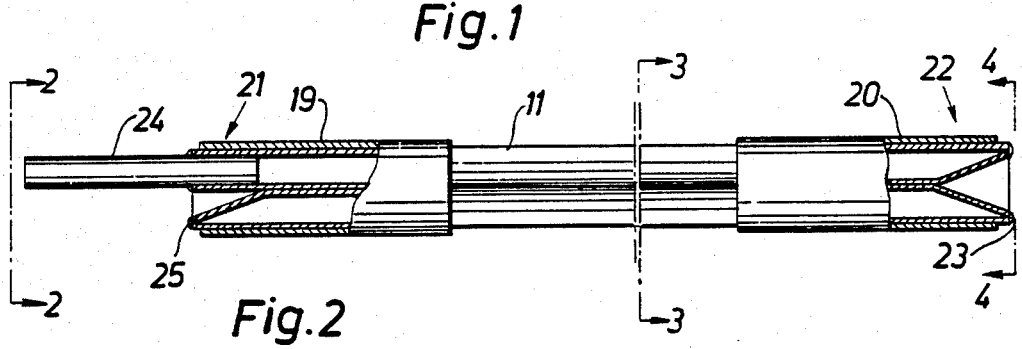
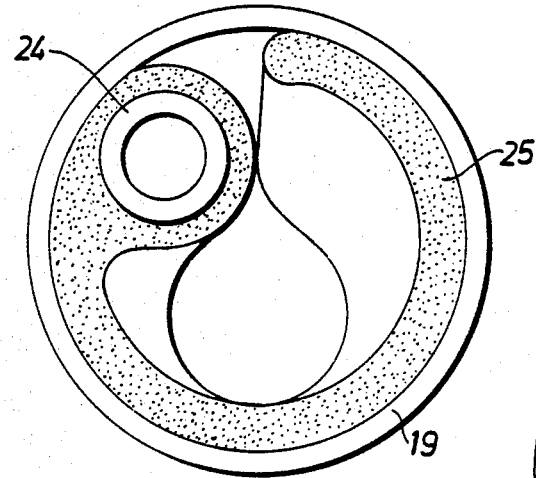
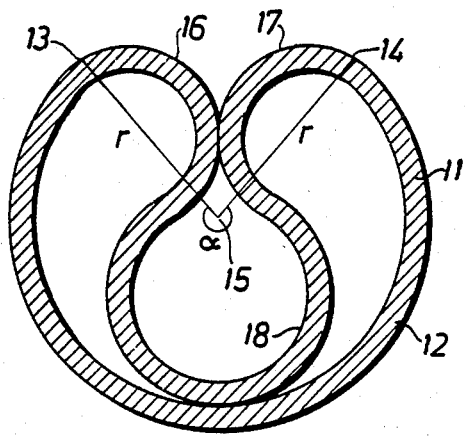
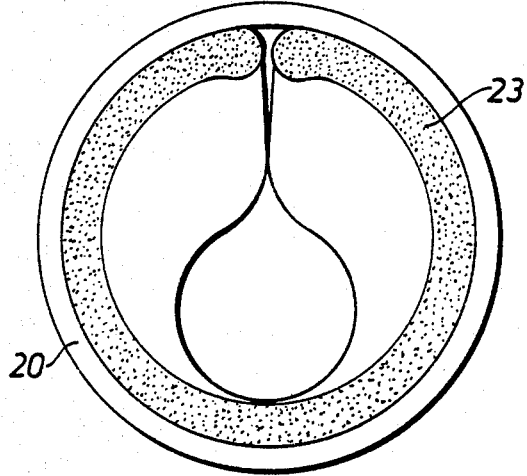

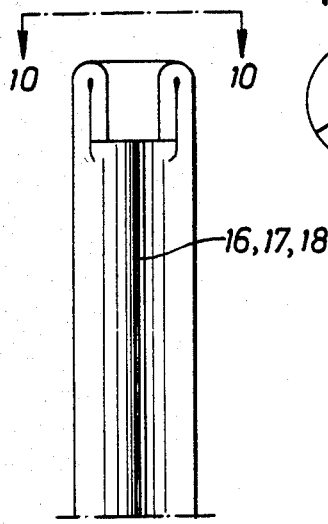
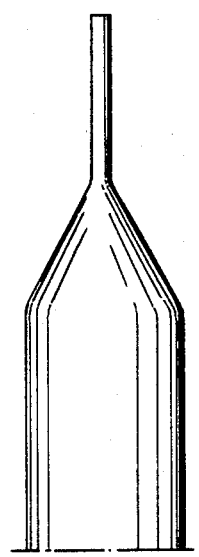
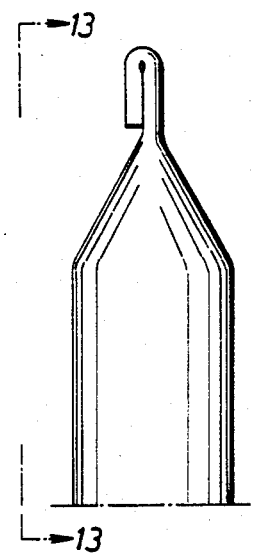
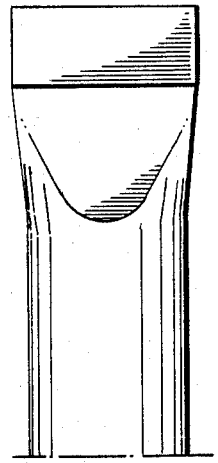
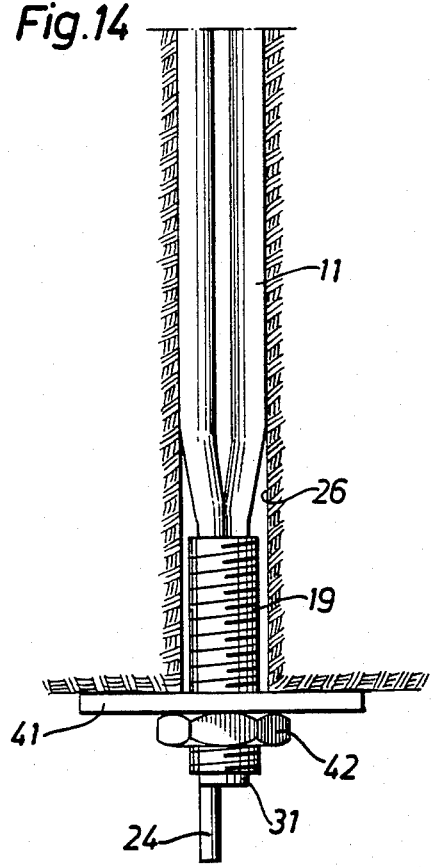

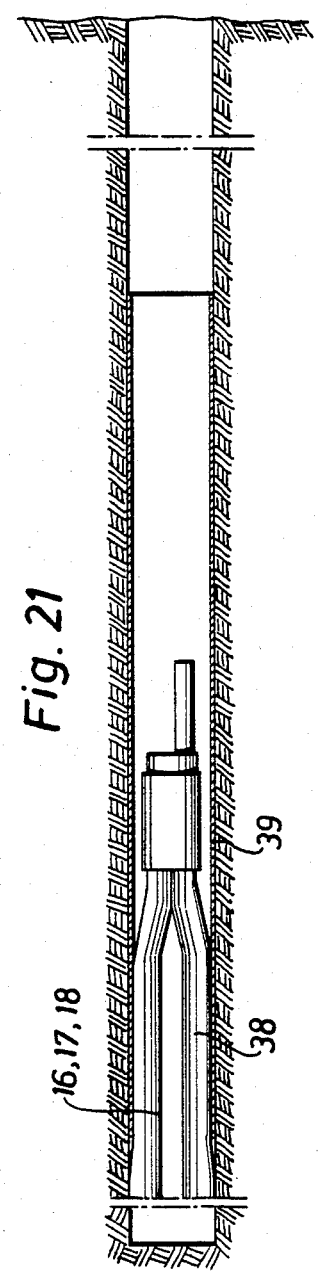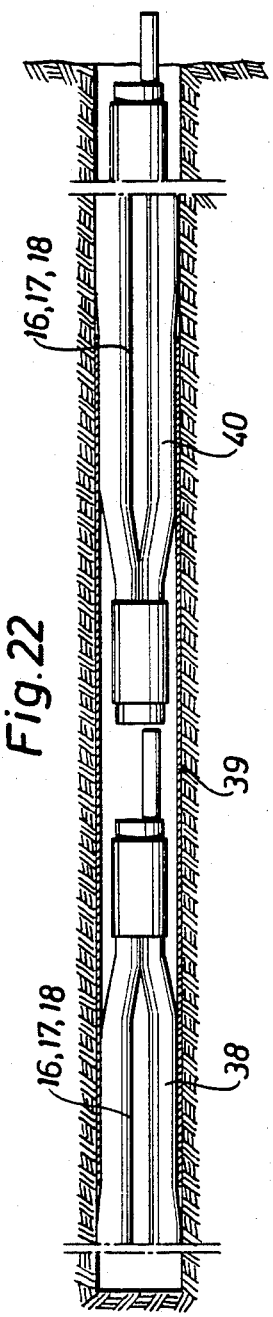

METHOD OF ROCK BOLTING AND TUBE-FORMED EXPANSION BOLT

This is a division of application Ser. No. 127,776, filed Mar. 6, 1980.

This invention relates to an expansion bolt useful in a method of rock bolting wherein a tube-formed bolt smaller than the hole is first inserted into the borehole and then expanded against the hole so that it becomes anchored.

In a prior art method, a rockbolt is used that has a short tube attached to its inner end. In the tube that has a circular cross-section, a weak explosive is arranged to expand the tube when detonating. Such bolts do not satisfactorily anchor in all rocks and the method is not very simple and it causes safety problems.

The invention will be described in more detail with reference to the accompanying drawings.

FIG. 1 is a side view, partly in section of a rockbolt according to the invention.

FIG. 2 is an end view seen as indicated by the arrows 2—2 in FIG. 1.

FIG. 3 is a cross-section on a larger scale taken along line 3—3 in FIG. 1. It is also a cross-section taken along line 3—3 in FIG. 6 and along line 3—3 in FIG. 8.

FIG. 4 is an end view as indicated by the arrows 4—4 in FIG. 1.

Figure 5:
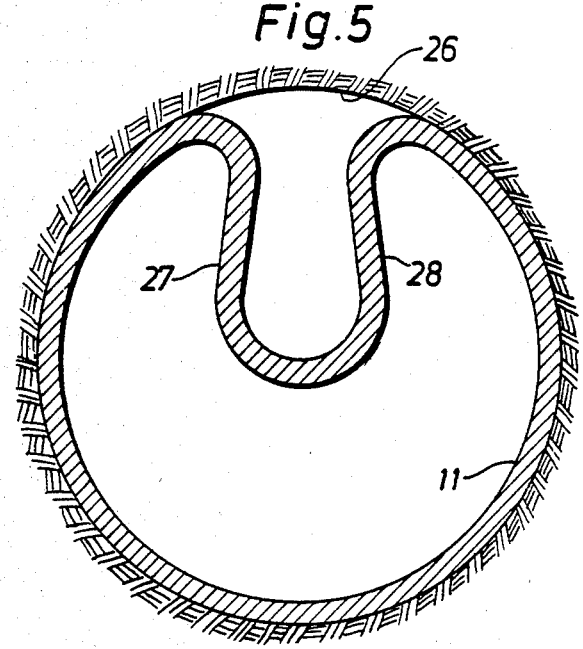

FIG. 5 is a cross-section corresponding to FIG. 3 but showing the rockbolt anchored in a borehole.

Figure 6:
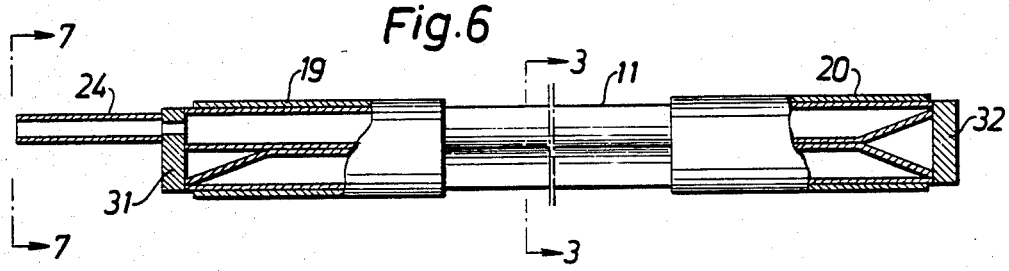

FIG. 6 is a side view, partly in section of the rockbolt shown in FIG. 1, the ends of the rockbolt being modified.

Figure 7:
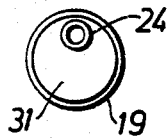

FIG. 7 is an end view seen as indicated by the arrows 7—7 in FIG. 6.

Figure 8:
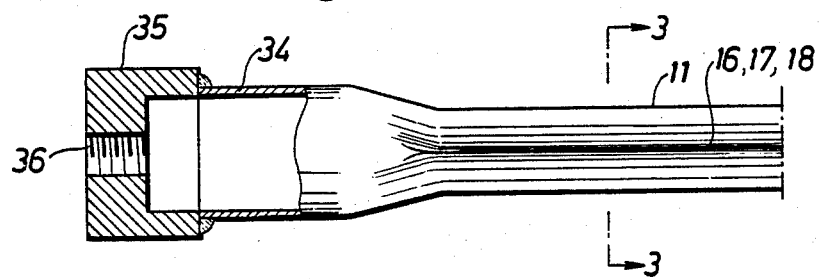

FIGS. 8 and 9 are side views of the outer end and bottom end respectively of another rockbolt according to the invention.

FIG. 10 is an end view seen as indicated by the arrows 10—10 in FIG. 9.

FIGS. 11–13 show the steps in sealing the bottom end shown in FIG. 9, FIG. 13 being a view seen as indicated by arrows 13—13 in FIG. 12.

Figure 15:
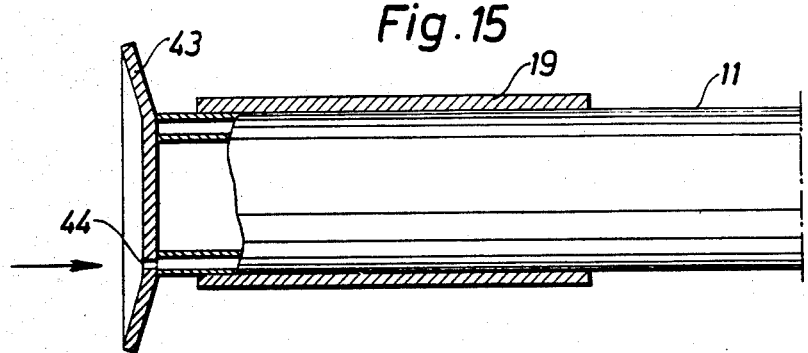
Figure 16:
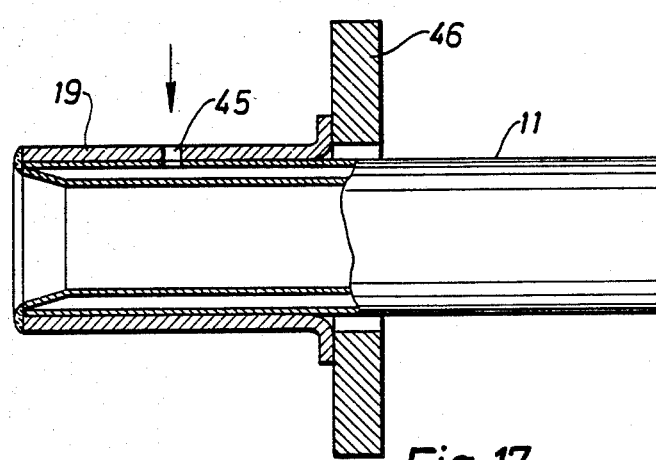

FIGS. 14, 15 and 16 are side views of the outer ends of other alternative designs of rockbolts according to the invention.

Figure 17:
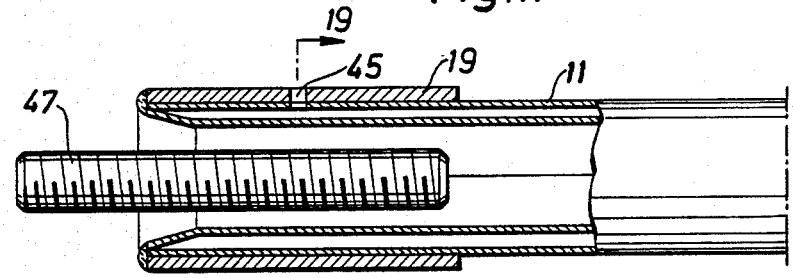

FIG. 17 is a side view of the outer end of still another design.

Figure 18:
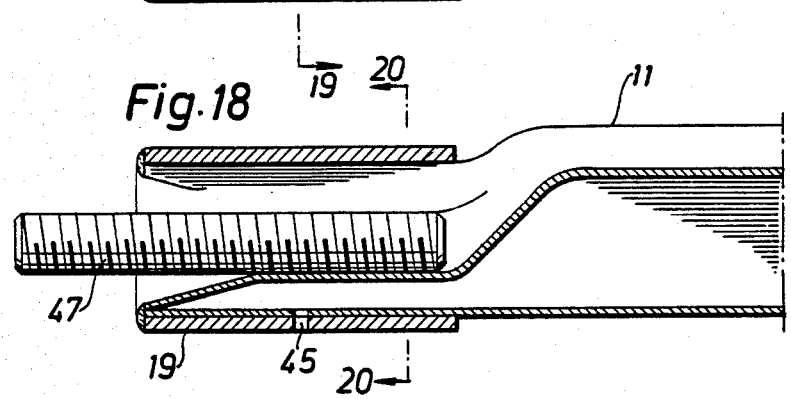

FIG. 18 is a side view corresponding to FIG. 17 but showing the rockbolt when it has been expanded.

Figure 19:
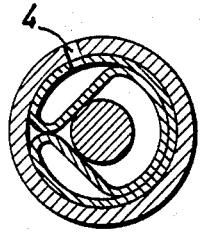

FIG. 19 is a cross-section taken along line 19—19 in FIG. 17.

Figure 20:
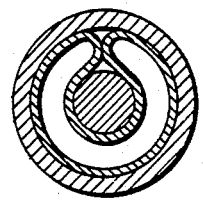

FIG. 20 is a cross-section taken along line 20—20 in FIG. 18.

FIGS. 21 and 22 show two steps in joining two rockbolts in a borehole.

The rockbolt shown in FIG. 1 comprises a tube 11 with a profile as shown in FIG. 3. Between the points 13 and 14 in FIG. 3, the periphery of the tube forms a circle arc 12 having a focus 15, a radius r, and a centre angle α that exceeds 180°, actually the centre angle exceeds also 270°. The tube 11 has been drawn, rolled or folded to have a deep depression that comprises two gently curved outer portions 16, 17 and a gently curved bottom portion 18. These three portions 16–18 can have the form of circle arcs as shown in FIG. 3. The outer portions 16, 17 are bent more than 180° as shown in FIG. 3 and the bottom portion 18 extends past the point 15 and to or almost to the circular outer portion 12 of the tube. The two outer portions 16, 17 contact each other ore are at least adjacent each other. The diameter of the circle arc 12 is the largest gauge of the tube 11.

Strengthening sleeves 19, 20 are disposed on both ends 21, 22 of the tube 11, and the bottom end 22 of the tube 11 is first punched and then sealed by means of a weld 23. A tubular fitting 24 is inserted in the outer end 21 of the tubes before the end is punched and sealed by means of a weld 25. In FIGS. 1 and 3, the bolt is shown before being used. In FIG. 5, the bolt is shown anchored in a borehole 26 by being expanded against the borehole. Before being expanded, the bolt can be freely inserted in the borehole 26 since it is substantially thinner than the borehole. The tube 11 is expanded by being pressurized by a fluid for example water of a pressure of for example 100–500 bar. The water is supplied from an external source through the fitting 24. The strengthening sleeves 19, 20 prevent the ends of the tube 11 from being expanded and the welds 23, 25 from breaking. If the tubes 11 are thin-walled and made of mild steel, a lower water pressure than 100 bar may be sufficient, but if the tubes 11 are thick-walled and are made of harder steel, a higher pressure than 500 bar may be necessary.

When the bolt is pressurized, the outer circular portion 12 of the tube 11 will be bent into contact with the borehole and the recession 16, 17, 18 will "roll" out in its outer portions 16, 17. The peripheral length of the tube 11 is the same before and after the expansion which reduces the risk of cracking. Since the remaining recession 16–18 is so large as shown in FIG. 5, it widens inwardly as shown or at least it will have substantially parallel walls 27, 28. The pressure will act on the walls 27, 28 in the direction of compressing the recession, and, as a result, there is a force acting in the direction of widening the recession when the bolt is relieved of pressure, which increases the frictional grip between the bolt and the borehole.

In FIG. 6 a bolt is shown that differs from the one shown in FIG. 1 by its ends. Two end plates, 31, 32 have been friction welded to the tube 11 and the fitting 24 has been friction welded to the outer plate 31. The fitting 24 can of course instead be affixed to the end plate 31 by means of threads. It is an advantage that a threaded fitting tube can be removed and replaced by a hook or another means in which for example conduits can be mounted when the bolt has been anchored.

In FIG. 8, the outer part of a bolt is shown that comprises a tube 11 which in contrast to the bolt shown in FIG. 1 has not the recession 16–18 along its entire length but which has a circular outer end 34 that is too wide to be inserted into the borehole. An end plate 35 with a threaded hole 36 for a fitting tube has been friction welded to the outer end of the tube 11. In FIG. 9 there is shown the bottom end of the bolt shown in FIG. 8. In FIGS. 11–13, the steps of making the end are shown. The end of the tube 11 is flattened as shown in FIG. 11 and bent as shown in FIGS. 12 and 13 before the longitudinal recession 16–18 shown in FIG. 3 is made so that the bottom end of the bolt will be as shown in FIG. 9. Thus, a tube with a circular cross-section is used for making the bolt according to FIGS. 8 and 9 and the tube is given the profile shown in FIG. 3 as the last step, whereas a tube having the profile shown in FIG. 3 is used for making the bolts shown in FIGS. 1 and 6.

In FIG. 14, the outer end of a rockbolt is shown which is modified from the rockbolt shown in FIG. 6 in that the outer strengthening sleeve 19 is threaded along its entire length so that a plate 41 can be clamped against the rock by means of a nut 42. The sleeve 19 can be secured to the tube for example by being welded to the tube 11 or to the end plate 31 of the tube.

In FIG. 15, the outer end of a bolt is shown on which a plate 43 is welded to the end of the tube 11. High pressure water can be supplied to the tube through a hole 44 in the plate 43.

In FIG. 16 which also shows the outer end of a bolt, there is a hole 45 in the sleeve 19 through which water can be supplied to expand the bolt. A rock engaging plate 46 has been loosely put onto the tube 11 before the sleeve 19 is mounted on the tube and fixed thereto. The plate 46 will take support on the sleeve 19 when the bolt is inserted in a borehole and the plate 46 contacts the rock.

In contrast to the design of FIG. 14 the plates 43 and 46 shown in FIGS. 15 and 16 cannot be tightened after the bolts have been anchored. Such tightening after the anchoring is, however, not necessary since, when the bolt is being expanded, it starts to expand at its axial mid portion and gets stuck there and as the expansion proceeds, the length of the bolt will decrease a few millimeters. This reduction of the length of the bolt will cause the plate to be forced against the rock provided that the plate is in contact with the rock before the expansion starts.

In FIG. 17, the outer end of a rock bolt similar to the one in FIG. 16 is shown. A threaded bolt 47 is inserted in the outer end as shown and it is held in position while the bolt is being expanded. The bolt will be clamped and affixed because of the expansion of the tube 11 as can be seen in FIGS. 18 and 20. The bolt 47 can be used as a support in which for example conduits can be suspended in a tunnel.

A bolt according to the invention, for example the bolt shown in FIG. 1 can be provided with a cutting edge at the front end so that it can be used to drill its own hole. Flushing fluid can during the drilling be supplied through the depression 18 shown in FIG. 3.

In FIGS. 21 and 22, there is illustrated a way of joining short rockbolts to form a long rockbolt. At first, a bolt 38 according to FIG. 1 or FIG. 6 is inserted in the borehole. It has a joining sleeve 39 attached to its outer end. Then when the bolt 38 is expanded the sleeve 39 becomes secured to the bolt by friction. Now, when this bolt 38 is anchored in the borehole, another bolt 40 is inserted in the borehole to extend into the sleeve 39. When this bolt is expanded, it will be secured to the sleeve 39 by friction. Thus, the two bolts 38, 40 and the joining sleeve 39 form a long rockbolt together.

The illustrated rockbolts are anchored by a friction grip along substantially their entire length. The bolts are preferably made of mild steel so that they will adapt to the irregularities of the borehole, for example to the helical form of the borehole. Most boreholes are somewhat helical and also when they are so little helical that the helical form is not easily noticed, the helical form improves the anchoring.

The expansion as described above is carried out by means of pressure fluid from an external source. Alternatively, it can be carried out in other ways, for example by means of an explosive in the bolt. The bolt can also be an open tube that has one or more longitudinal depressions and the expansion can be carried out mechanically by means of a mandrel that is forced into the tube.

Although expansion rockbolts with a prime object of supporting the strata have been described above, expansion bolts according to the invention can be used for other purposes, for example when the prime object is to anchor a comparatively short bolt so that it can carry an external load of any kind.

We claim:

1. A tube-formed elongated expansion bolt, comprising:
    an expansible elongated tube having a deep continuous longitudinal depression which extends inwardly of the bolt toward the axis of the bolt, the tube having a major closed cross-sectional portion in the area of the deep longitudinal depression, and the tube being closed at one end thereof which is the bottom end thereof;
    said tube having a longitudinal portion in the area of the longitudinal depression which has a peripheral length in a cross-section which exceeds the periphery of a circle having a diameter equal to the largest transverse dimension of the bolt in the cross-section of the bolt;
    said longitudinal portion being expandable to increase said largest transverse dimension of said bolt under the temporary application of high-pressure fluid to the interior of said tube without stretching the material of said tube; and
    coupling means at the end portion of said bolt opposite said bottom end for applying high-pressure fluid to the interior of said tube to expand said tube against a borehole so as to cause permanent gripping action of the tube against the inner surface of the bore hole without stretching the material of the tube, the pressure being released after expansion of said bolt.

2. Expansion bolt according to claim 1, wherein said bolt, before being used, has an outer periphery that has a substantially circular portion (12) through an angle that exceeds 180°, and said bolt has a sole longitudinal depression (16, 17, 18) opposite said circular portion (12), said sole longitudinal depression extending past the focus of said circular portion (12).

3. Expansion bolt according to claim 2, wherein said sole longitudinal depression (16, 17, 18) widens inwardly and has a gently curved bottom.

4. Expansion bolt according to claim 1, further comprising strengthening sleeves (19, 20) on both ends of said tube, said strengthening sleeves being arranged to prevent expansion of said both ends of said tube when said tube is expanded under the influence of said high-pressure fluid.

5. Expansion bolt according to claim 1, wherein at least said cross-section of said longitudinal portion of said bolt is collapsed in form.

6. Expansion bolt according to claim 5, further comprising strengthening sleeves (19, 20) on both ends of the bolt arranged to prevent expansion of the ends of the bolt when the bolt is expanded.

7. Expansion bolt according to claim 1, wherein said bolt is expandable over a major part of its length.

8. Expansion bolt according to claim 1, wherein said bolt is expandable over substantially the entire length thereof.

9. Expansion bolt according to claim 1, including means for closing both ends of said bolt, and including an inlet at said end opposite to said inner end to which said external source of pressure fluid can be connected.

10. Expansion bolt according to claim 9, comprising a strengthening sleeve (19) at the end of said bolt opposite said bottom end, and a passage (45) extending radially through said strengthening sleeve and into the interior of said tube to form said coupling means for pressure fluid.

11. Expansion bolt according to claim 9, wherein said bolt is expandable over a major part of its length.

12. Expansion bolt according to claim 11, wherein said bolt is expandable over substantially the entire length thereof.

13. Expansion bolt according to claim 1, further comprising a sleeve (39) extending therefrom and into which a second expansion bolt is insertable for expansion thereagainst.

* * * * *